(12) United States Patent
Chandrasekher et al.

(10) Patent No.: US 11,368,251 B1
(45) Date of Patent: Jun. 21, 2022

(54) CONVERGENT MULTI-BIT FEEDBACK SYSTEM

(71) Applicant: Aira Technologies, Inc., Saratoga, CA (US)

(72) Inventors: Anand Chandrasekher, Saratoga, CA (US); RaviKiran Gopalan, Cupertino, CA (US); Yihan Jiang, Cupertino, CA (US); Arman Rahimzamani, San Jose, CA (US)

(73) Assignee: Aira Technologies, Inc., Saratoga, CA (US)

( * ) Notice: Subject to any disclaimer, the term of this patent is extended or adjusted under 35 U.S.C. 154(b) by 0 days.

(21) Appl. No.: 17/555,269

(22) Filed: Dec. 17, 2021

Related U.S. Application Data

(60) Provisional application No. 63/131,268, filed on Dec. 28, 2020.

(51) Int. Cl.
*H04L 1/00* (2006.01)
*H03M 13/00* (2006.01)

(52) U.S. Cl.
CPC .......... *H04L 1/0072* (2013.01); *H04L 1/0041* (2013.01); *H04L 1/0046* (2013.01); *H04L 1/0047* (2013.01)

(58) Field of Classification Search
CPC ... H04L 1/0072; H04L 1/0041; H04L 1/0046; H04L 1/0047; H03M 13/00
See application file for complete search history.

(56) References Cited

U.S. PATENT DOCUMENTS

| 5,657,325 A | 8/1997 | Lou |
| 5,910,182 A | 6/1999 | Dent |

(Continued)

FOREIGN PATENT DOCUMENTS

| CN | 106487610 A | 3/2017 |
| GB | 2493081 A | 1/2013 |
| WO | WO2022081434 A1 | 4/2022 |

OTHER PUBLICATIONS

Kim et al., "Deepcode: Feedback Codes via Deep Learning," [online] Jul. 2, 2018 [retrieved on Apr. 17, 2020], Retrieved from the Internet: < URL:https://arxiv.org/abs/1807.00801.v1>, 24 pages.

(Continued)

*Primary Examiner* — Justin R Knapp
(74) *Attorney, Agent, or Firm* — Carr & Ferrell LLP

(57) ABSTRACT

Provided are systems and methods for convergent error vector indexing and retransmission in wireless data verifications. An example method includes transmitting a network packet to a receiver; receiving a further network packet being a copy of the network packet as received by the receiver, determining, based on the network packet and the further network packet, an error vector and locations of errors in the further network packet; sending, to the receiver, a first indexing packet including the locations of the errors; receiving a second indexing packet being a copy of the first indexing packet as received by the receiver; determining, based on the error vector and the second indexing packet, the locations of the errors in the second indexing packet; and sending a third indexing packet including the locations of the errors to the receiver, where the receiver corrects the further network packet using the third indexing packet.

20 Claims, 12 Drawing Sheets

(56) References Cited

U.S. PATENT DOCUMENTS

| | | | |
|---|---|---|---|
| 5,968,197 A | 10/1999 | Doiron | |
| 6,418,549 B1 | 7/2002 | Ramchandran | |
| 6,505,253 B1 | 1/2003 | Chiu | |
| 7,016,658 B2 * | 3/2006 | Kim | H04L 1/1812 375/264 |
| 7,124,205 B2 | 10/2006 | Craft et al. | |
| 7,447,234 B2 | 11/2008 | Colas et al. | |
| 7,664,883 B2 | 2/2010 | Craft et al. | |
| 7,848,350 B1 | 12/2010 | Inamdar | |
| 7,971,131 B1 | 6/2011 | Ordentilch | |
| 8,223,643 B1 | 7/2012 | Wolfgang | |
| 8,327,232 B2 * | 12/2012 | Budampati | H04L 1/1845 714/776 |
| 8,352,830 B2 * | 1/2013 | Landschaft | H04L 1/0045 714/752 |
| 8,437,267 B2 * | 5/2013 | Amir | H04L 45/64 370/252 |
| 8,473,821 B2 * | 6/2013 | Taghavi Nasrabadi | H04L 1/0065 714/752 |
| 8,990,663 B2 | 3/2015 | Liu et al. | |
| 10,270,564 B2 * | 4/2019 | Djukic | H04L 1/1896 |
| 10,749,594 B1 | 8/2020 | O'Shea et al. | |
| 11,088,784 B1 | 8/2021 | Gopalan et al. | |
| 11,191,049 B1 | 11/2021 | Chandrasekher et al. | |
| 2001/0030954 A1 | 10/2001 | Hameleers | |
| 2002/0026523 A1 | 2/2002 | Mallory et al. | |
| 2002/0054608 A1 | 5/2002 | Wan | |
| 2002/0122510 A1 | 9/2002 | Yakhnich et al. | |
| 2003/0215029 A1 | 11/2003 | Limberg | |
| 2004/0170120 A1 | 9/2004 | Reunamaki et al. | |
| 2005/0094561 A1 | 5/2005 | Raaf | |
| 2005/0208897 A1 | 9/2005 | Lyons | |
| 2006/0047862 A1 | 3/2006 | Shearer et al. | |
| 2006/0268996 A1 | 11/2006 | Sethi et al. | |
| 2007/0168197 A1 | 7/2007 | Vasilache | |
| 2008/0002688 A1 | 1/2008 | Kim et al. | |
| 2008/0002790 A1 | 1/2008 | Itoh | |
| 2008/0225735 A1 | 9/2008 | Qiu | |
| 2008/0250299 A1 | 10/2008 | Maillet et al. | |
| 2009/0086711 A1 | 4/2009 | Capretta et al. | |
| 2009/0119566 A1 | 5/2009 | Hiromitsu | |
| 2009/0276686 A1 | 11/2009 | Liu et al. | |
| 2010/0037270 A1 | 2/2010 | Bennet | |
| 2010/0165868 A1 | 7/2010 | Gersemsky | |
| 2010/0192175 A1 | 7/2010 | Bachet | |
| 2010/0202416 A1 | 8/2010 | Wilhelmsson et al. | |
| 2010/0262885 A1 | 10/2010 | Cheng | |
| 2011/0131461 A1 | 6/2011 | Schulz | |
| 2011/0206019 A1 | 8/2011 | Zhai et al. | |
| 2011/0206065 A1 | 8/2011 | Kim et al. | |
| 2011/0216787 A1 | 9/2011 | Ai et al. | |
| 2013/0018889 A1 | 1/2013 | Jagmohan | |
| 2013/0132786 A1 | 5/2013 | Tanigawa et al. | |
| 2013/0223203 A1 | 8/2013 | Bai | |
| 2013/0250179 A1 | 9/2013 | Lida | |
| 2013/0339036 A1 | 12/2013 | Baeckstroem et al. | |
| 2014/0140342 A1 | 5/2014 | Narad | |
| 2014/0241309 A1 | 8/2014 | Hilton | |
| 2015/0009902 A1 | 1/2015 | Emmanuel | |
| 2016/0006842 A1 | 1/2016 | Tahir | |
| 2016/0062954 A1 | 3/2016 | Ruff | |
| 2016/0254881 A1 | 9/2016 | Meylan | |
| 2017/0006616 A1 | 1/2017 | Singh et al. | |
| 2017/0269876 A1 | 9/2017 | Mukhopadhyay et al. | |
| 2018/0013808 A1 | 1/2018 | Petry et al. | |
| 2018/0048567 A1 | 2/2018 | Ignatchenko | |
| 2018/0101957 A1 | 4/2018 | Talathi | |
| 2018/0267850 A1 | 9/2018 | Froelich et al. | |
| 2018/0314985 A1 | 11/2018 | O'Shea | |
| 2018/0359811 A1 | 12/2018 | Verzun et al. | |
| 2019/0028237 A1 | 1/2019 | Pan et al. | |
| 2019/0037052 A1 | 1/2019 | Deshpande | |
| 2019/0097680 A1 | 3/2019 | O'Brien | |
| 2019/0097914 A1 | 3/2019 | Zhong et al. | |
| 2019/0392266 A1 | 12/2019 | Zhong et al. | |
| 2019/0393903 A1 | 12/2019 | Mandt et al. | |
| 2020/0128279 A1 | 4/2020 | Han et al. | |
| 2020/0177418 A1 | 6/2020 | Hoydis et al. | |
| 2020/0320371 A1 | 10/2020 | Baker | |
| 2020/0383169 A1 | 12/2020 | Takahashi et al. | |
| 2021/0014939 A1 | 1/2021 | Verzun et al. | |
| 2021/0034846 A1 | 2/2021 | Ko et al. | |
| 2021/0056058 A1 | 2/2021 | Lee et al. | |
| 2021/0120440 A1 | 4/2021 | Reimann et al. | |
| 2021/0319286 A1 | 10/2021 | Gunduz | |
| 2021/0392033 A1 | 12/2021 | Haartsen | |
| 2022/0045696 A1 | 2/2022 | Boussard | |
| 2022/0114436 A1 | 4/2022 | Gopalan et al. | |

OTHER PUBLICATIONS

Gopalan et al., "Systems and Methods for Artificial Intelligence Discovered Codes", U.S. Appl. No. 17/069,794, filed Oct. 13, 2020, Specification, Claims, Abstract, and Drawings, 43 pages.

Goutay et al., "Deep reinforcement learning autoencoder with noisy feedback." 2019 International Symposium on Modeling and Optimization in Mobile, Ad Hoc, and Wireless Networks (WiOPT). IEEE, Jun. 24, 2019, 6 pages.

Yamamoto et al., "Application of Yamamoto-Itoh coding scheme to discrete memoryless broadcast channels." 2017 IEEE International Symposium on Information Theory (ISIT). IEEE, 2017, 5 pages.

Aoudia et al., "End-to-end learning of communications systems without a channel model." 2018 52nd Asilomar Conference on Signals, Systems, and Computers. IEEE, Dec. 5, 2018, 6 pages.

Duman et al., "On optimal power allocation for turbo codes." Proceedings of IEEE International Symposium on Information Theory. IEEE, Jun. 29-Jul. 4, 1997, 1 page.

Arvinte et al., "Deep log-likelihood ratio quantization." 2019 27th European Signal Processing Conference (EUSIPCO). IEEE, 2019, 5 pages.

"International Search Report" and "Written Opinion", Patent Cooperation Treaty Application No. PCT/US2021/054265, dated Nov. 24, 2021, 24 pages.

"International Search Report" and "Written Opinion", Patent Cooperation Treaty Application No. PCT/US2021/0063356, dated Jan. 14, 2022, 9 pages.

"International Search Report" and "Written Opinion", Patent Cooperation Treaty Application No. PCT/US2021/061902, dated Jan. 24, 2022, 11 pages.

Henze, Martin, "A Machine-Learning Packet-Classification Tool for Processing Corrupted Packets on End Hosts", Diploma Thesis, Chair of Communication and Distributed Systems, RWTH Aachen University, Mar. 2011, 103 pages.

"International Search Report" and "Written Opinion", Patent Cooperation Treaty Application No. PCT/US2021/06617, dated Mar. 11, 2022, 12 pages.

Kötter et al., "Coding for Errors and Erasures in Random Network Coding", IEEE Transactions on Information Theory 54.8; 3579-3591. Mar. 25, 2008; Retrieved on Feb. 19, 2022 (Feb. 19, 2022) from <https://arxiv.org/pdf/cs/0703061.pdf> entire document; 30 pages.

Grcar, Joseph, "How ordinary elimination became Gaussian elimination", Historia Mathematica vol. 38 Issue 2, May 2011; Available online Sep. 28, 2010; pp. 163-218.

"International Search Report" and "Written Opinion", Patent Cooperation Treaty Application No. PCT/US2021/064735, dated Mar. 17, 2022, 11 pages.

"International Search Report" and "Written Opinion", Patent Cooperation Treaty Application No. PCT/US2021/065003 dated Mar. 22, 2022, 10 pages.

* cited by examiner

Non-Convergent Scheme

Convergent Scheme

CONVERGENT MULTI-BIT FEEDBACK SYSTEM

CROSS REFERENCE TO RELATED APPLICATIONS

The present application claims priority of U.S. Provisional Patent Application No. 63/131,268 filed on Dec. 28, 2020 and entitled "Indexing-based Feedback Codes and Methods of Use," which is incorporated herein by reference in its entirety for all purposes.

TECHNICAL FIELD

This disclosure relates to data processing. More specifically, this disclosure relates to systems and methods for convergent error vector indexing and retransmission in wireless data verifications.

BACKGROUND

In wireless data transmission, data received by a receiver from a transmitter can be corrupted due to interference and signal attenuation. Conventional methods of transmission of network packets include re-transmitting an entire network packet from the transmitter to the receiver if the network packet is corrupted during the initial transmission. However, re-transmission of the entire network packet consumes a considerable portion of bandwidth of a wireless communication channel, thus making the conventional methods resource-consuming and inefficient.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to systems and methods for convergent error vector indexing and retransmission in wireless data verifications. According to one example embodiment of the present disclosure, a method for convergent error vector indexing and retransmission in wireless data verifications is provided. The method may commence with transmitting, by a transmitter, a network packet to a receiver. The method may further include receiving, by the transmitter from the receiver, a further network packet. The further network packet may be a copy of the network packet as received by the receiver. The method may continue with determining, by the transmitter, based on the network packet and the further network packet, an error vector. The method may include determining, by the transmitter and based on the error vector, locations of errors in the further network packet. The method may then continue with sending, by the transmitter to the receiver, a first indexing packet including the locations of the errors. The method may include receiving, by the transmitter from the receiver, a second indexing packet. The second indexing packet may be a copy of the first indexing packet as received by the receiver. The method may continue with determining, by the transmitter and using the error vector and the second indexing packet, the locations of the errors in the second indexing packet. The method may include sending, by the transmitter, a third indexing packet including the locations of the errors to the receiver. The receiver may be configured to correct the further network packet using the third indexing packet.

According to another embodiment, a system for convergent error vector indexing and retransmission in wireless data verifications is provided. The system may include at least one processor and a memory communicatively coupled to the processor and storing instructions executable by the at least one processor. The processor can be configured to implement the operations of the above-mentioned method for convergent error vector indexing and retransmission in wireless data verifications.

According to yet another aspect of the disclosure, provided is a non-transitory computer-readable storage medium, which embodies computer-readable instructions. When the computer-readable instructions are executed by a computer, they cause the computer to implement the above-mentioned method for multi-tier caching of data.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF DRAWINGS

Exemplary embodiments are illustrated by way of example and not limitation in the figures of the accompanying drawings, in which like references indicate similar elements.

DETAILED DESCRIPTION

Figure 1:
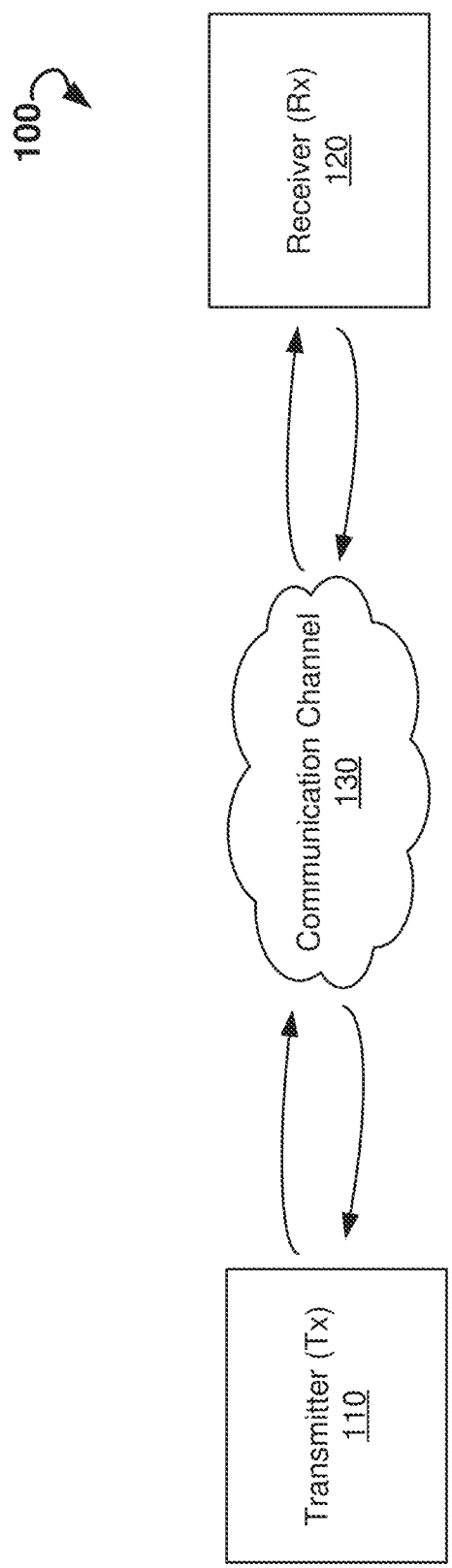
FIG. 1 is a block diagram of an environment, in which systems and methods for convergent error vector indexing and retransmission in wireless data verifications can be implemented, according to some example embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The technology described herein relates to systems and methods for convergent error vector indexing and retransmission in wireless data verifications. Some embodiments of the present disclosure may provide reliable data transmission between a transmitter and a receiver. The transmitter may transmit a network packet to receiver via a communication channel. The network packet may include a payload. The network packet can be corrupted upon the transmission and a pre-determined number of iterations involving additional data transfer between the receiver and the transmitter can be performed to correct the network packet. Each of the iterations may include the following steps. Upon receipt of the network packet from the transmitter, when a message verification by the receiver fails, the receiver may send the network packet back to the transmitter in the form in which the network packet was received by the receiver, i.e., in the form of the corrupted network packet. The transmitter may determine, based on the original network packet and the corrupted network packet, an error vector. The transmitter may use the error vector to determine locations of errors in the corrupted network packet.

Upon determining the locations of errors, the transmitter may send, to the receiver, an indexing packet that includes the locations of the errors. The indexing packet may be corrupted upon the transmission. The receiver may receive the indexing packet and, upon receipt of the indexing packet, send the indexing packet back to the transmitter in the form in which the indexing packet was received by the receiver, i.e., in the form of a corrupted indexing packet.

The transmitter may receive, from the receiver, the corrupted indexing packet and determine, based on the error vector, the locations of the errors in the corrupted indexing packet. Upon determining the locations of the errors in the corrupted indexing packet, the transmitter may send a further indexing packet to the receiver. The further indexing packet may include the locations of the errors in the corrupted indexing packet. The receiver may receive the further indexing packet from the transmitter and correct the corrupted network packet (i.e., the first network packet received from the transmitter) using the third indexing packet.

In general, when a message verification by the receiver fails, instead of requesting a retransmission of the entire network packet, the receiver sends the network packet back to the transmitter. According to this disclosure, the receiver sends the whole payload of the network packet to the transmitter only once. In next cycles, the receiver sends the parts of the network packet back to the transmitter before correcting the payload. Specifically, the transmitter analyzes the received network packet to determine whether there is an area with error aggregation. Then only this partial message with error aggregation is retransmitted to the receiver along with the start position of the partial message. The receiver then verifies the transmission and, if the message verification by the receiver is successful, replaces the area in the network packet with the retransmitted partial message.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

Referring now to the drawings, FIG. 1 is a block diagram of environment 100, in which systems and methods for convergent error vector indexing and retransmission in wireless data verifications can be implemented, according to some example embodiments. The environment 100 may include a transmitter (Tx) 110, a receiver (Rx) 120, and a communication channel 130. The transmitter 110 may send network packets over the communication channel 130. The receiver 120 may receive the network packets and analyze integrity of the network packets.

In various embodiments, the transmitter 110 and/or the receiver 120 may include a computer (e.g., a laptop computer, a tablet computer, and a desktop computer), a server, a cellular phone, a smart phone, a gaming console, a multimedia system, a smart television device, wireless headphones, an infotainment system, an in-vehicle computing device, an informational kiosk, a smart home computer, a software application, a computer operating system, a modem, a router, and so forth.

The communication channel 130 may include the Internet or any other network capable of communicating data between devices. Suitable networks may include or interface with anyone or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3line, Digital Data Service connection, Digital Subscriber Line connection, an Ethernet connection, an Integrated Services Digital Network line, a dial-up port such as a Y.90, Y.34 or Y.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The communication channel 130 can further include or interface with anyone or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

Figure 2:
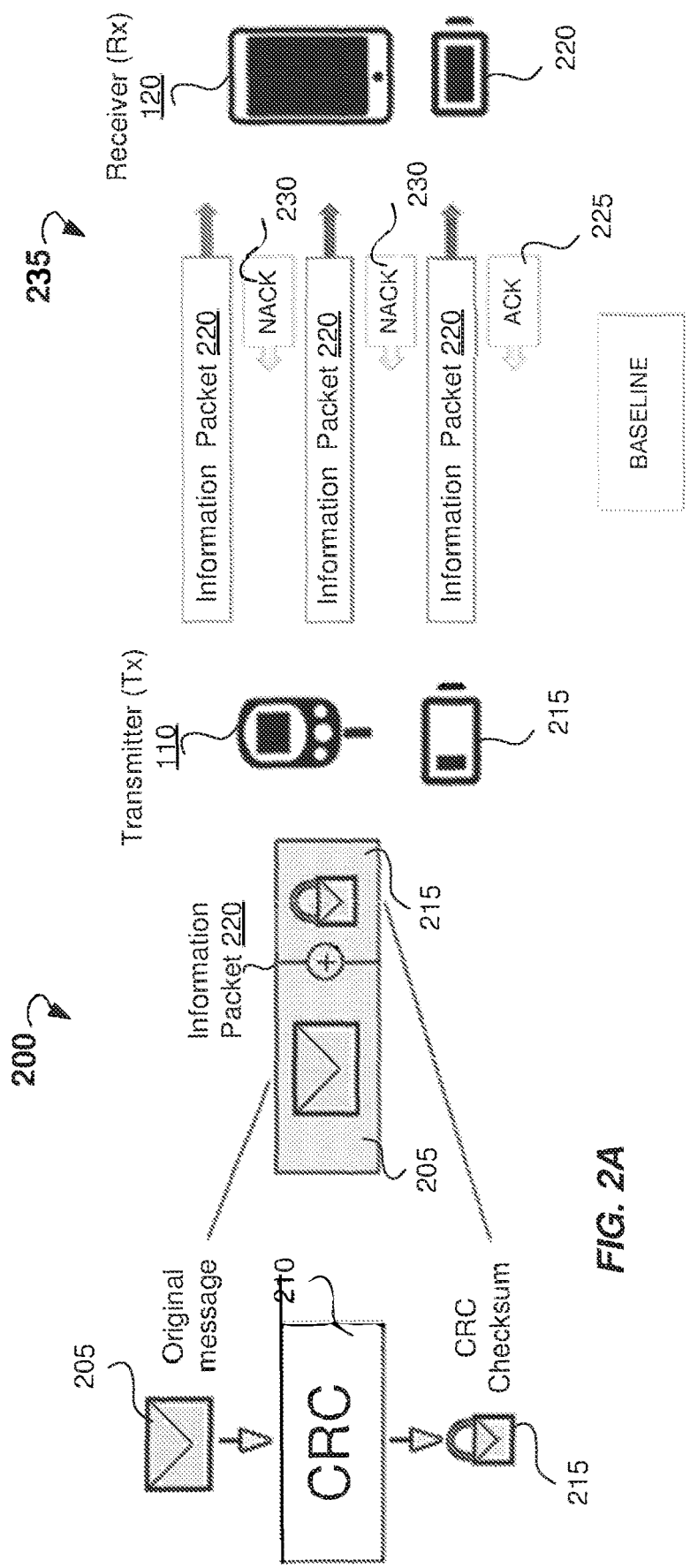
FIG. 2A is a schematic diagram showing an example cyclic redundancy check method of an information packet, according to some example embodiments.
FIG. 2B is a schematic diagram showing an automatic repeat request method for wireless data transmission, according to some example embodiments.

FIG. 2A is a schematic diagram showing an example cyclic redundancy check (CRC) method 200 of an information packet 220. FIG. 2B is a schematic diagram showing an automatic repeat request method 235 for wireless data transmission, according to some example embodiments of the present disclosure.

Wireless communication requires sending the information packet 220 (also referred as a network packet) from a transmitter 110 to a receiver 120 without errors. However, the information packet 220 can be corrupted even if transmitted with strong error correction codes. Current wireless protocols utilize error detecting codes and retransmission schemes to protect the integrity of the information packets. CRC 210 is the most-widely-utilized short error-detecting code that is used to detect accidental payload changes during transmission. CRC 210 is computed on the payload 205 (original message) of the information packet 220 at the transmitter 110 to obtain the CRC checksum 215. The CRC checksum 215 is attached to the end of the payload 205 to form the information packet 220. Both the payload 205 and the CRC checksum 215 are transmitted from the transmitter 110 to the receiver 120. At the receiver 120, the received CRC checksum is compared to the CRC checksum computed by the receiver 120 on the received payload. If the received CRC checksum equals to the computed CRC checksum, the CRC check has passed. If the received CRC checksum does not match the computed CRC checksum, the CRC check has failed implying that the received payload 205 includes an error.

When CRC check passes, there is very high probability that the information packet 220 is not contaminated. In this case, an acknowledgment (ACK) message 225 is sent from the receiver 120 to the transmitter 110 to signal the transmitter 110 to continue with transmitting the next information packet.

When CRC check fails, there is a very high probability that the information packet 220 is contaminated. In this case, a non-acknowledgment (NACK) message 230 is sent from the receiver 120 to the transmitter 110 to ask for retransmission of the information packet 220. There is some probability that the ACK message or the NACK message may not be received by the transmitter 110. In this case, the transmitter 110 retransmits the information packet 220 after a predetermined timeout.

CRC check passes only when the entire information packet 220 received by the receiver 120 is error free. In its standard form, CRC is not designed for correcting errors. CRC check fails even in cases where a single bit in the received information packet 220 is erroneous. Thus, the presence of a single erroneous bit in the received information packet triggers a NACK transmission from the receiver 120 back to the transmitter 110, which in turn attempts to retransmit the entire information packet 220.

Typically, in real-world communication channels, errors in information packets happen in short groups or aggregation, due to either (a) modulation causing correlation between adjacent bits, and (b) interference causing a few adjacent bytes corrupted. Interference can be interpreted as spontaneous and persistent channel quality degradation which can last during transmission of a large portion of a packet. Accordingly, the channel quality drop may result in a sudden increase in the number of correlated errors over a large section of the received information packet.

Figure 3:
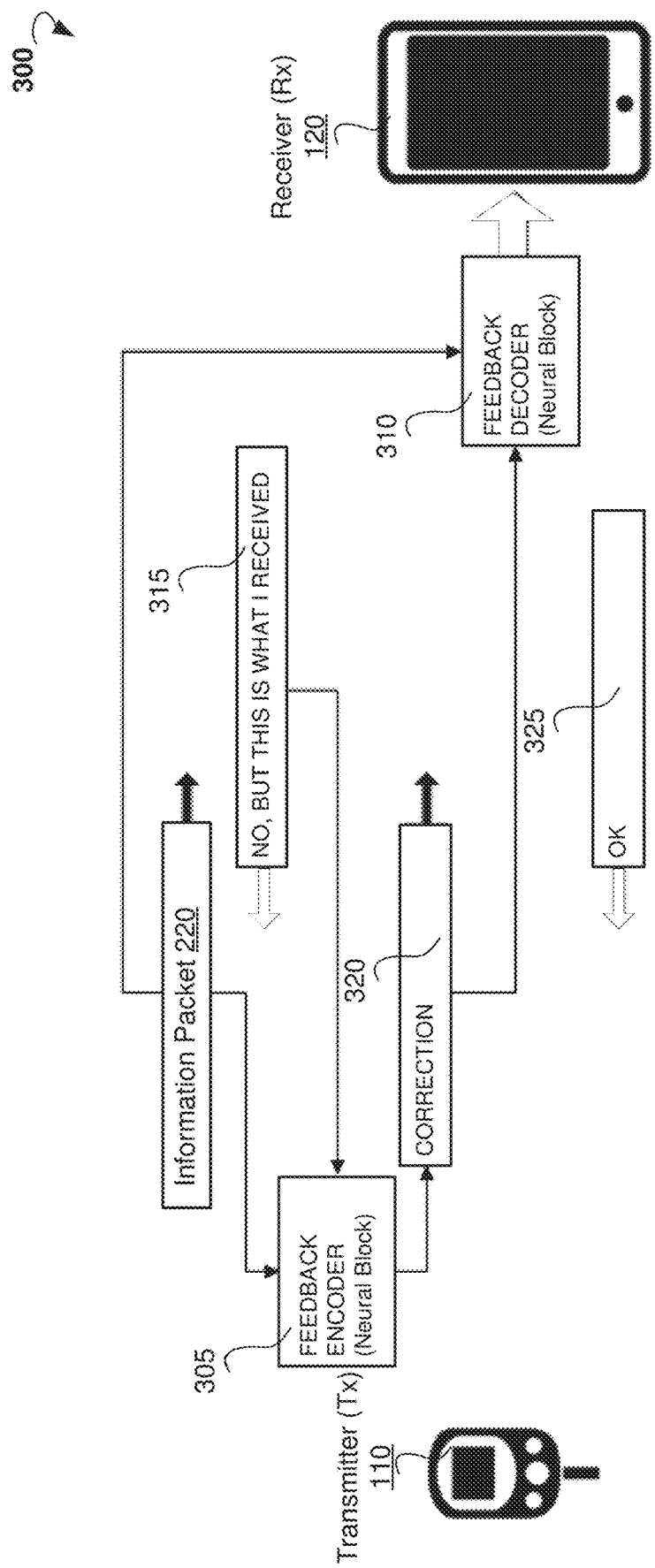
FIG. 3 is a schematic diagram illustrating operations performed by a system for convergent error vector indexing and retransmission in wireless data verifications, according to an example embodiment.

FIG. 3 is a schematic diagram 300 illustrating operations performed by a system for convergent error vector indexing and retransmission in wireless data verifications (also referred to herein as a convergent multi-bit feedback system), according to an example embodiment. The convergent multi-bit feedback system improves the efficiency of conventional communication systems. The convergent multi-bit feedback system feeds back more than one-bit information and enables the transmitter side to transmit information more efficiently (beyond just retransmission).

As shown in FIG. 3, a transmitter 110 may send an information packet 220 (also referred to herein as a message or a network packet) to a receiver 120. The information packet 220 sent by the transmitter 110 may be encoded by a feedback encoder 305 (Neural Block) associated with the transmitter 110. The receiver 120 may have a feedback decoder 310 (Neural Block) configured to decode all messages received from the transmitter 110. Therefore, the feedback decoder 310 may decode the information packet received from the transmitter 110. The receiver 120 may perform the CRC of the information packet 220 to determine whether the calculated CRC is correct. If the CRC fails, the receiver 120 may send the received information packet as a message 315 back to the transmitter 110.

The message 315 may be received by the feedback encoder 305 associated with the transmitter 110. Upon receipt of the message 315, the transmitter 110 may send a correction message 320 to the receiver 120. The correction message 320 may include locations of the errors in the message 315 received back by the transmitter 110 from the receiver 120.

The receiver 120 may receive the correction message 320 and correct the information packet 220 based on the correction message 320. If the CRC check of the corrected information packet 220 is successful, the receiver 120 may send a confirmation message 325 back to the transmitter 110.

Figure 4:
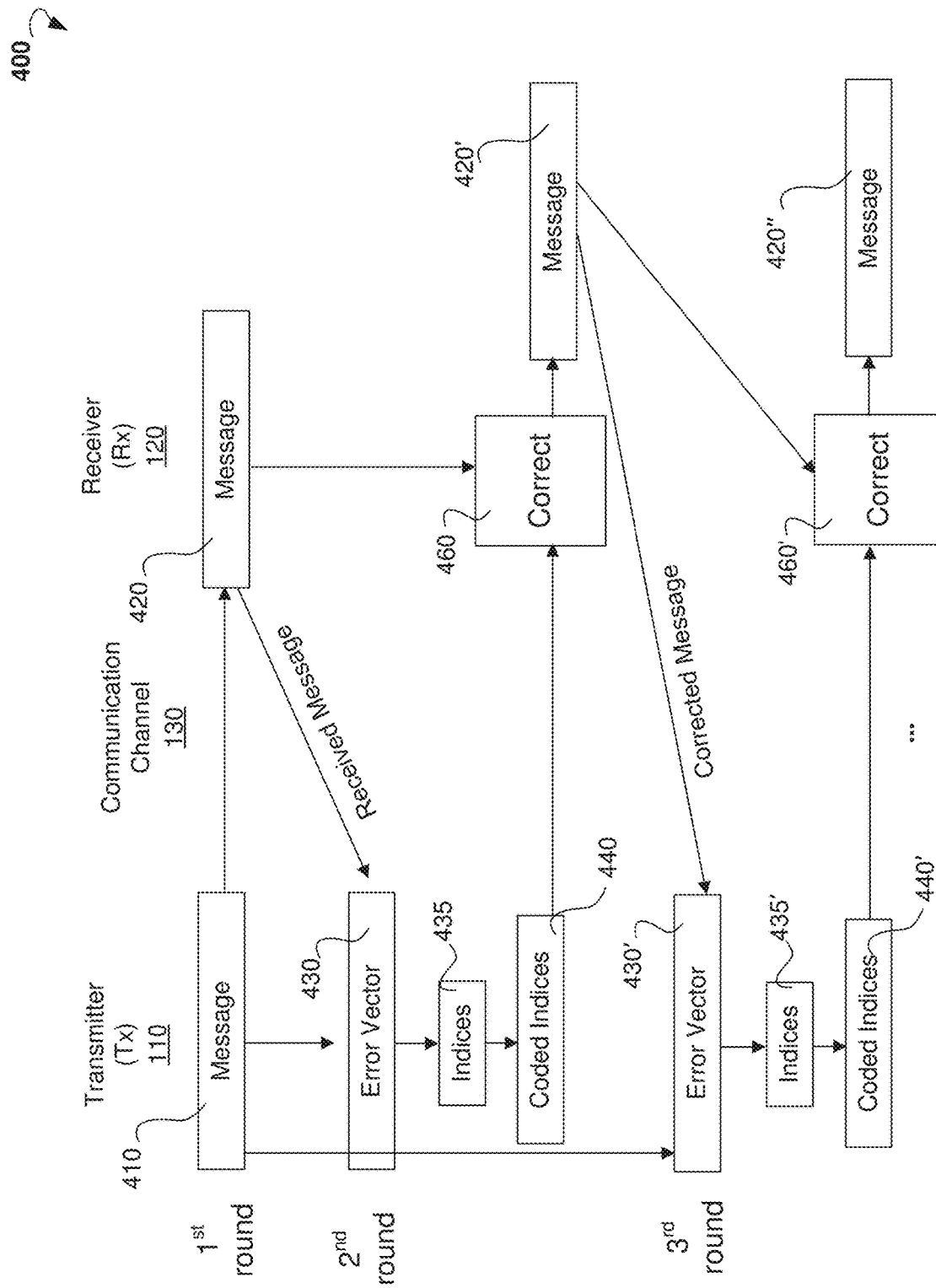
FIG. 4 shows a full feedback scheme for data transfer between a transmitter and a receiver, via a communication channel.

FIG. 4 shows a full feedback scheme 400 for data transfers between a transmitter 110 and a receiver 120 via a communication channel 130. In full feedback scheme 400, the receiver 120 sends received message or corrected message back to transmitter at each round.

According to the first round of the scheme 400, the transmitter 110 sends a message 410 to the receiver 120. The message 410 is an information packet (shown as information packet 220 in FIGS. 2A and 3) including a payload and CRC checksum calculated on the payload at the transmitter side. The receiver 120 may receive the message 410 in form of a message 420. The receiver 120 may calculate a new CRC checksum on the received payload of the message 420 and compare the new CRC checksum to CRC checksum received in the message 420 from transmitter 110. If the calculated CRC checksum does not match the received CRC checksum, the receiver 120 determines that the received message 420 has errors and send the received message 420 back to transmitter 110.

According to the second round of the scheme 400, the transmitter 110 compares the message 420 received from the receiver 120 to the message 410 originally sent to the receiver 120 and determines an error vector 430. The error vector 430 can be found as a bitwise difference between the message 410 and the message 420. Based on the error vector 430, the transmitter 110 determines indices 435. The indices 435 indicate the locations of errors in the message 420.

In an example embodiment, the error vector can be compressed by using the error position indexing/de-indexing approach. The indices 435 include the index of locations of errors. For example, in an example indexing method for a block of length N (N=7), each error position requires ceiling (log(N)) bits. As N becomes larger and the error vector is sparse, the indexing method can save a significant amount of energy-per-bit. De-indexing is the reverse operation of indexing and includes reconstructing the error vector by the received indexed code at the receiver side. With the help of underlying channel code, the error vector 430 can be noise independent, and can be reconstructed properly.

The transmitter 110 may encode the indices 435 and send the coded indices 440 to be used to correct the message 420 to the receiver 120. The receiver 120 may decode the coded indices 440 to restore the error vector 430. In block 460, the receiver 120 may bitwise add the error vector 430 determined based on the coded indices 440 to the corresponding portion of the message 420. The receiver 120 may calculate CRC checksum for the corrected message 420'. If CRC check fails, the receiver 120 sends the corrected message 420' to the transmitter 110.

According to third round of the scheme 400, the transmitter 110 may determine error vector 430' based on the original message 410 and the message 420'. The transmitter 110 may determine, based on error vector 430', new indices 435', encode the indices 435', and obtain coded indices 440'. The transmitter 110 may send the coded indices 440' to the receiver 120. In block 460', the receiver 120 may decode the coded indices 440' to recover error vector 430' and correct the message 420' (i.e., the previously corrected message 420) to obtain a message 420''. The receiver 120 may determine CRC checksum for message 420'', and, if CRC fails, send the message 420'' for another round of correction. The scheme 400 can include a pre-determined number of rounds. If the message 420 is not corrected after the pre-determined number of rounds, the receiver 120 may request that the transmitter 110 resend the entire original message 410.

The issue faced by the full feedback scheme is that the receiver needs to send the whole message back at every round. So if in the first round the message does not pass the CRC test, the receiver needs to send the whole message back, where the message can be long and consumes a considerable portion of bandwidth. Second time when the receiver sends the message back, the receiver still needs to send the whole message, which is long and consumes a considerable portion of bandwidth. Therefore, sending the whole message back consumes the bandwidth of the feedback channel.

In contrast to the full feedback scheme 400 shown in FIG. 4, the systems and methods of the present disclosure provide a convergent feedback scheme for a convergent error vector indexing and retransmission in wireless data verifications. Specifically, the message decoded by the receiver may be sent back as feedback to the transmitter via a noiseless link. It is usually assumed that the forward channel used by the transmitter to send data to the receiver is free and clean, however, in practice, the forward channel is not free and is potentially noisy. While the forward channel is noisy, the feedback channel (from the receiver to the transmitter) is not noisy.

The feedback described with reference to FIG. 4 is fed as the updated message (which equals the whole block length) every round. So the feedback message length does not change: each round the message needs to be sent by the receiver to the transmitter. However, at the second round, the transmitter side already knows what message the receiver received (as shown in FIG. 4). Therefore, after the first round, the receiver can send, in feedback, only indices the receiver received rather than the corrected message, so the future feedback can be further compressed, as discussed with reference to FIG. 5 below. Sending back the received indices instead of the whole message can improve the usage of bandwidth of the feedback channel. Specifically, the systems and methods of the present disclosure provide reduction in the bandwidth required by the feedback channel and improve the feedback channel efficiency. If the systems and methods can provide the feedback with less bandwidth, the systems and methods can potentially provide more flexibility to applying error correction coding on feedback channels, which may lead to improved noise tolerance.

Moreover, in the full feedback scheme of FIG. 4, the receiver needs to perform decoding of the messages at each round. This may be time- and resource-consuming. Typically, the receiver is required to send messages back to the transmitter with minimal processing (mostly due to protocol requirement). However, the full feedback system shown on FIG. 4 requires decoding the indices and conducting correction, which may exceed processing time limit for communication protocols (e.g., Bluetooth®). To address this issue, the systems and methods of the present disclosure may minimize the processing time needed by the receiver side. This is provided by sending immediate feedback (the receiver sends back what the receiver received), rather than updating the original message and sending the updated original message to the transmitter.

Figure 5:
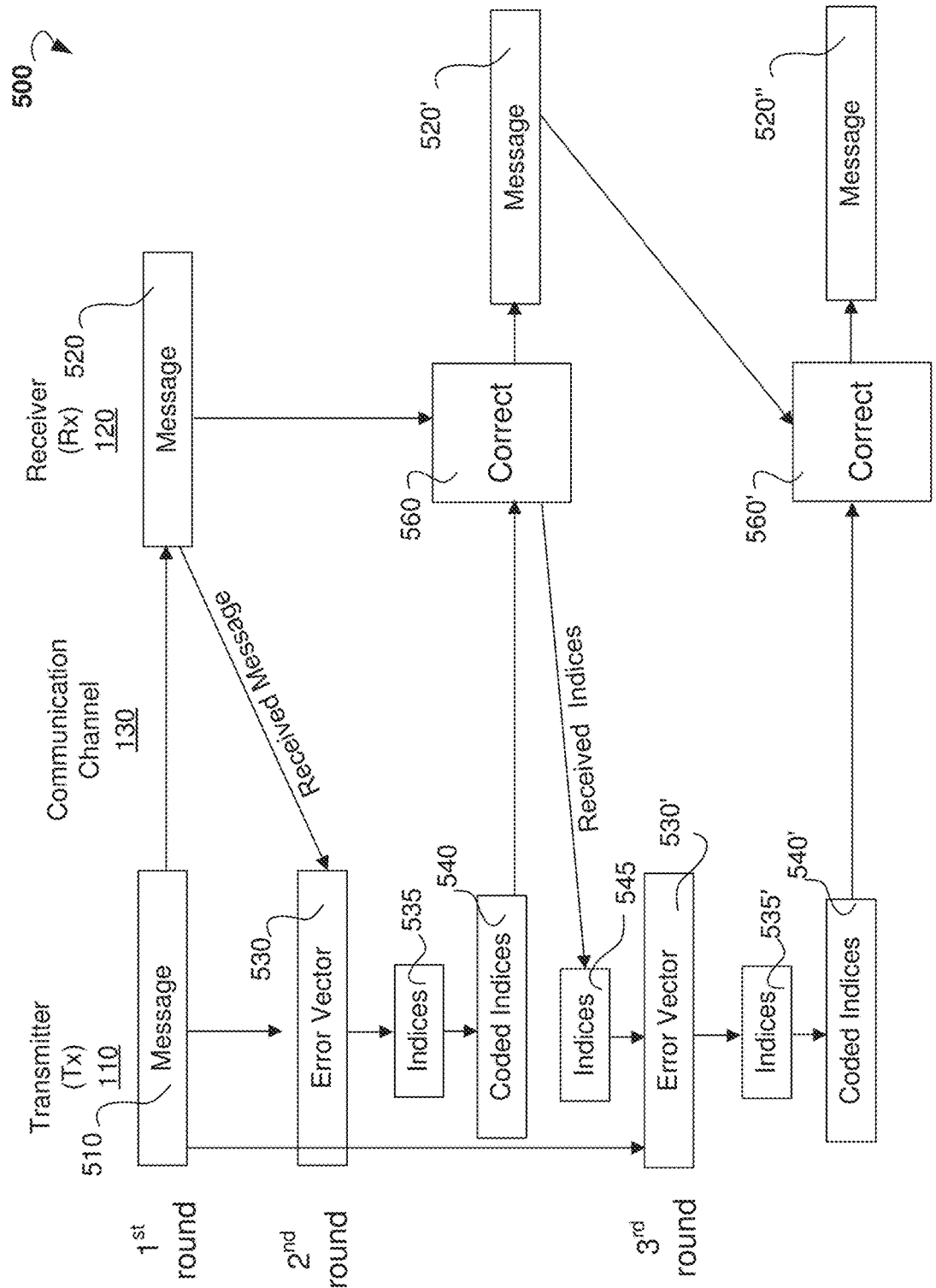
FIG. 5 shows a convergent feedback scheme for data transfer between a transmitter and a receiver via a communication channel, according to an example embodiment.

More specifically, to avoid sending back the received message every round, the convergent multi-bit feedback system is configured to send back the received indices to the transmitter side, as shown in FIG. 5.

FIG. 5 shows a convergent feedback scheme 500 for data transfer between a transmitter 110 and a receiver 120 via a communication channel 130 by using the convergent multi-bit feedback system of the present disclosure. In contrast to the full feedback system shown in FIG. 4, in which feedback corrected message is sent at every round, in the convergent multi-bit feedback system shown in FIG. 5 feedback, starting with the second round, the receiver sends back only indices rather than the corrected message.

More specifically, in the first round, a transmitter 110 may send a network packet shown as message 510 to a receiver 120. The transmitter 110 and the receiver 120 may be communicatively connected via a wireless communication channel. In an example embodiment, the wireless communication channel may be an asymmetrical communication channel including a first channel and a second channel. The second channel may have a stronger signal than the first channel. The transmitter 110 may be configured to send first messages to the receiver 120 via the first channel. The receiver 120 may be configured to send second messages to the transmitter 110 via the second channel. In an example embodiment, the wireless communication channel may include a mobile phone cellular network channel. In an example embodiment, a phone is the transmitter side and a base station is a receiver side. As the based station has more power than the phone, the second channel from the based station to the phone may have a stronger signal than the first channel from the phone to the base station.

The receiver 120 may receive the network packet in form of a further network packet. The receiver 120 may determine whether the further network packet has been corrupted by testing a check sum of a further payload of the further network packet. Upon determination that the further network packet has been corrupted, the receiver 120 may directly send the further network packet back to the transmitter 110.

The transmitter 110 may receive, from the receiver 120, the further network packet (shown as message 520) (operation A). The further network packet may be a copy of the network packet as received by the receiver 120.

In the second round, the transmitter 110 may determine an error vector 530 (operation B). The error vector 530 may be determined based on the network packet and the further network packet. In an example embodiment, the error vector 530 may be a difference between a payload of the network packet and a further payload of the further network packet. The transmitter 110 may determine locations of errors (shown as indices 535) in the further network packet (operation C). The determination may be performed based on the error vector 530.

Upon determination of the locations of errors, the transmitter 110 may send a first indexing packet to the receiver 120 (operation D). In an example embodiment, prior to the sending the first indexing packet, the transmitter 110 may encode the first indexing packet using an error-correction code. The transmitter 110 may encode the indices 535 to obtain coded indices 540 and send the coded indices 540 as the first indexing packet to the receiver 120. The receiver 120 may receive the first indexing packet that includes the locations of the errors in form of the coded indices 540. The receiver 120 may be configured to decode the encoded first indexing packet to obtain a second indexing packet. In block 560, the receiver 120 may correct the further network packet shown as the message 520 and obtain the message 520'. The correction may be made using the coded indices 540' received in the first indexing packet.

The receiver 120 may determine whether the second indexing packet has been corrupted by testing a check sum of a payload of the second indexing packet. Upon determination that the second indexing packet has been corrupted, the receiver 120 may directly send the second indexing packet back to the transmitter 110. The transmitter 110 may receive, from the receiver 120, the second indexing packet shown as indices 545 (operation E). The second indexing packet may be a copy of the first indexing packet as received by the receiver 120.

In the third round, the transmitter 110 may determine an error vector 530'. The error vector 530' may be determined based on the first indexing packet and the second indexing packet. The transmitter 110 may determine, using the error vector 530' and the second indexing packet, the locations of the errors (shown as indices 535') in the second indexing packet (operation F).

In an example embodiment, the transmitter 110 may encode the indices 535' to obtain coded indices 540' and send the coded indices 540' as a third indexing packet to the receiver 120 (operation G). In an example embodiment, prior to the sending the third indexing packet, the transmitter 110 may encode the third indexing packet using the error-correction code. The third indexing packet, i.e., the coded indices 540', may include the locations of the errors in the indices 545 received from the receiver 120.

Prior to correcting the further network packet, the receiver 120 may decode the encoded third indexing packet to obtain the third indexing packet. In block 560', the receiver 120 may correct the further network packet (shown as the message 520) and obtain the message 520". The correction may be made using the coded indices 540' received in the third indexing packet.

In an example embodiment, the receiver 120 may be configured to generate a further error vector based on the third indexing packet. The receiver 120 may perform bitwise summation of the further error vector and a further payload of the further network packet to correct the further network packet.

In an example embodiment, the transmitter 110 may receive, from the receiver 120, an indication that the further network packet (the message 520") has been corrupted. Based on the indication, the transmitter 110 may repeat operations (A), (B), (C), (D), (E), (F), and (G).

The fact that that receiver does not need to process or decode the indices and does not go back and correct the message means that the turnaround time between receiving a correction message by the receiver, checking the CRC, and sending the received message out to the transmitter is minimal.

In FIG. 5, the received message 520' (Rx_msg) is derived from correcting the previous received message 520 with received indices 535, as: Rx_msg'=correct(Rx_msg, indices). The correct function is bijective and deterministic. So knowing both previous received messages and indices is equivalent to knowing the corrected message. At the end of the second round, instead of sending the message 520' (Rx_msg'), the system can send just the decoded indices. Sending just decoded indices is equivalent to sending the message 520' (Rx_msg').

Typically, the indices are much shorter than the original network packets, so sending the indices may save feedback bandwidth. For example, in case of sending a block length 800 bits packet, if there is only one bit error on the second round, the full previous feedback system of FIG. 4 needs to send 800 bits back. In contrast, in the convergent multi-bit feedback system of FIG. 5, the one bit indexing just needs 10 bits ($2^{10}=1024>800$) to send back.

Figure 6A:
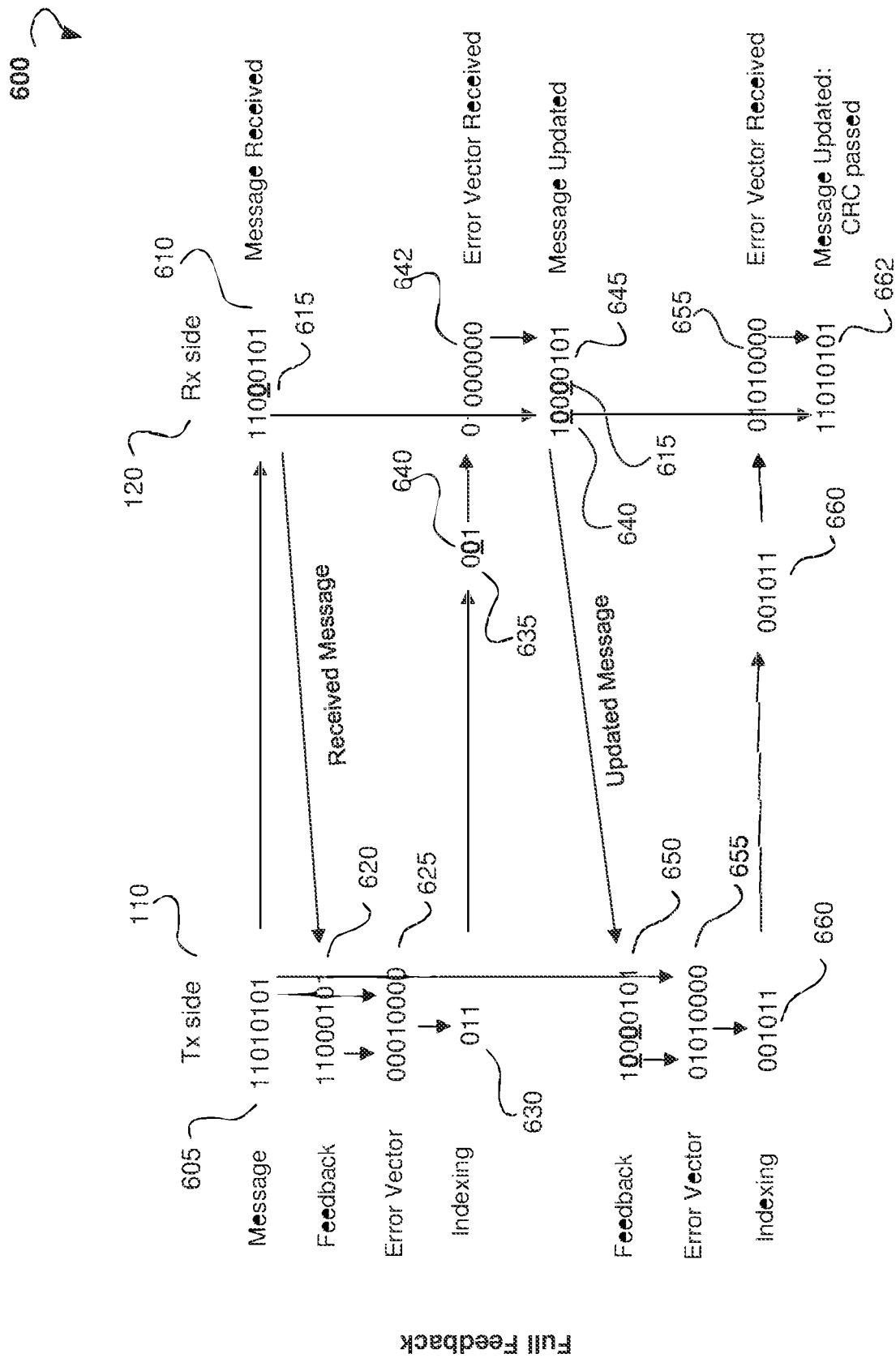
FIG. 6A shows an example full feedback provided by a full feedback system.

FIG. 6A shows an example full feedback 600 provided by a full feedback system. The transmitter 110 sends a message 605 to the receiver 120. The receiver 120 receives the message 605 in as a message 610 with one bit 615 being incorrect. The receiver 120 does not know which bit is incorrect, but can determine that the message 610 did not pass the CRC check. The receiver 120 may send the message 610 back to the transmitter 110. The transmitter 110 may receive the message 610 as a feedback message 620. Based on the message 605 and the feedback message 620, the transmitter 110 may determine an error vector 625. Based on the error vector 625, the transmitter 110 may determine locations of errors in the feedback message 620 and send the indexed error vector 630 (i.e., the locations of errors) to the receiver 120. The receiver 120 may receive the indexed error vector 630 as an indexed error vector 635 with one bit 640 being incorrect. The receiver 120 does not know which bit is incorrect. The receiver 120 may use the indexed error vector 635 to determine the error vector 642 and update (i.e., correct) the message 610 based on the error vector 642 and obtain an updated message 645. Therefore, the updated message 645 may have errors in two bits, 640 and 615.

The receiver 120 may send the updated message 645 to the transmitter 110. The transmitter 110 may receive the updated message 645 as a feedback message 650. Based on the feedback message 650 and the message 605, the transmitter 110 may determine an error vector 655. Based on the error vector 655, the transmitter 110 may determine locations of errors in the feedback message 650 and send the indexed error vector 660 (i.e., the locations of errors in the feedback message 650 and, hence, in the updated message 645) to the receiver 120.

The receiver 120 may receive the indexed error vector 660 and determine the error vector 655. Based on the error vector 655, the receiver 120 may update the updated message 645 to obtain a second updated message 662. The receiver 120 may perform the CRC check of the second updated message 662 and determine that the CRC check is successful, which means that the second updated message 662 corresponds to the message 605 originally sent by the transmitter 110.

Figure 6B:
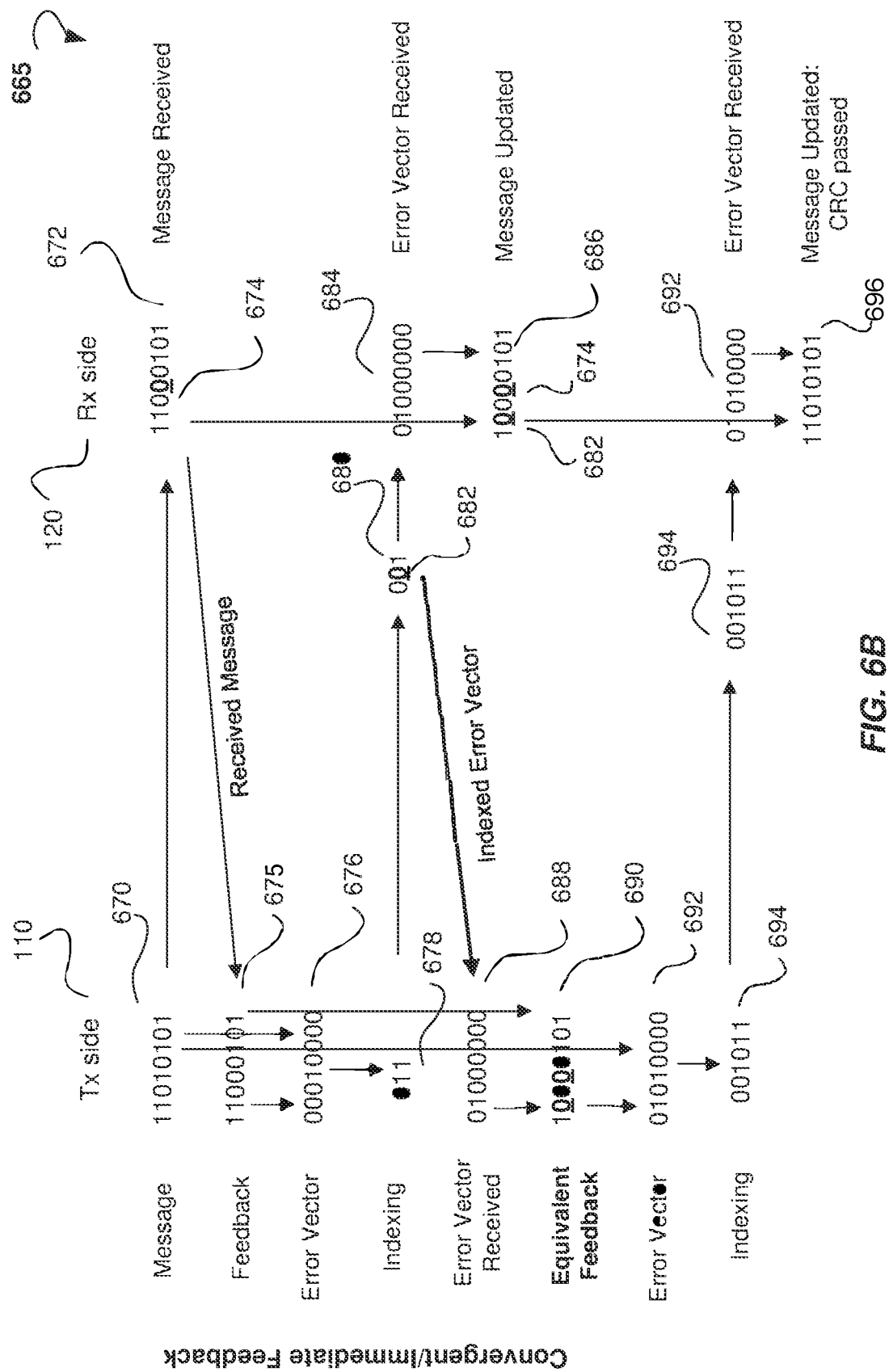
FIG. 6B shows an example convergent feedback provided by a system for convergent error vector indexing and retransmission in wireless data verifications, according to an example embodiment.

FIG. 6B shows an example convergent feedback 665 (also referred to as immediate feedback) provided by a convergent multi-bit feedback system, according to an example embodiment. The convergent multi-bit feedback system sends back an immediate feedback, which is equivalent to feedback in the updated message. The equivalent feedback shown in FIG. 6B can be composed by the immediate feedback.

The transmitter 110 sends a message 670 to the receiver 120. The receiver 120 receives the message 670 as a message 672 with one bit 674 incorrect. The receiver 120 may not know which bit is incorrect, but can determines that the message 672 did not pass the CRC check. The receiver 120 may send the message 672 back to the transmitter 110. The transmitter 110 may receive the message 672 as a feedback message 675. Based on the message 670 and the feedback message 675, the transmitter 110 may determine an error vector 676. Based on the error vector 676, the transmitter 110 may determine locations of errors in the feedback message 675 and send the indexed error vector 678 (i.e., the locations of errors) to the receiver 120. The receiver 120 may receive the indexed error vector 678 as an indexed error vector 680 with one bit 682 incorrect. The receiver 120 may not know which bit is incorrect or how many bits are incorrect.

The receiver 120 may use the indexed error vector 680 to determine the error vector 684 and update (i.e., correct) the message 672 based on the error vector 684 and obtain an updated message 686. Therefore, the updated message 686 may have errors in two bits 682 and 674.

The receiver 120 may directly send the indexed error vector 680 back to the transmitter 110. The indexed error vector 680 can be a three-bit message. Therefore, the receiver 120 may send the three-bit indexed error vector 680 instead of sending an eight-bit updated message 645 shown in FIG. 6A. Therefore, the receiver 120 may consume less bandwidth of the communication channel between the receiver 120 and the transmitter 110.

The transmitter 110 may receive the indexed error vector 680 as an error vector 688. Based on the error vector 688 and error vector 676, the transmitter 110 may determine equivalent feedback 690. Based on the equivalent feedback 690, the transmitter 110 may determine an error vector 692 with locations of errors in the equivalent feedback 690. The transmitter 110 may send the indexed error vector 694 (i.e., the locations of errors in the equivalent feedback 690 and, hence, in the updated message 686) to the receiver 120.

The receiver 120 may receive the indexed error vector 694 and determine the error vector 692. Based on the error vector 692, the receiver 120 may update the updated message 686 to obtain a second updated message 696. The receiver 120 may perform the CRC check of the second updated message 696 and determine that the CRC check is successful, which means that the second updated message 696 corresponds to the message 670 originally sent by the transmitter 110.

Therefore, the amount of feedback sent by the receiver 120 to the transmitter 110 is initially eight bits (see the message 672) and then converges to three bits (see the indexed error vector 680). Therefore, in the first round, the transmitter 110 sends an eight-bit message and the receiver 120 sends the eight-bit feedback. In the second round, the transmitter 110 sends a three-bit message and the receiver 120 sends the three-bit feedback. So the amounts of information transmitted from the transmitter 110 to the receiver 120 and from the receiver 120 to the transmitter 110 are symmetric and can decrease with each round. Thus, the amounts of information transmitted are convergent and can reduce all the way to one bit in some embodiments.

The convergent multi-bit feedback system not only reduces the feedback bandwidth, but also reduces the processing time because the receiver does not need to process the received messages immediately. The receiver only needs to send the received messages back without processing.

In an example embodiment, the indices can be coded, so as to combat the noise on the feedback channel. Moreover, since the indices are originally coded, sending back what the receiver received to the transmitter can result in natural coding. The convergent multi-bit feedback system is also referred to an immediate feedback system, which can satisfy both (a) minimizing processing time at the receiver, and (b) improving the reliability of the feedback channel. The immediate feedback is thus favorable for deploying in protocol-based communication systems.

Figure 7A:
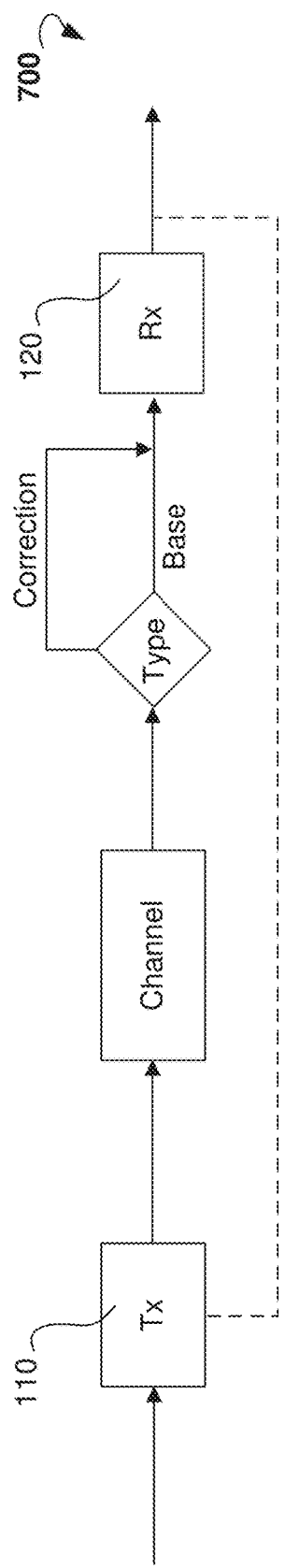
FIG. 7A illustrates a non-convergent feedback scheme.
Figure 7B:
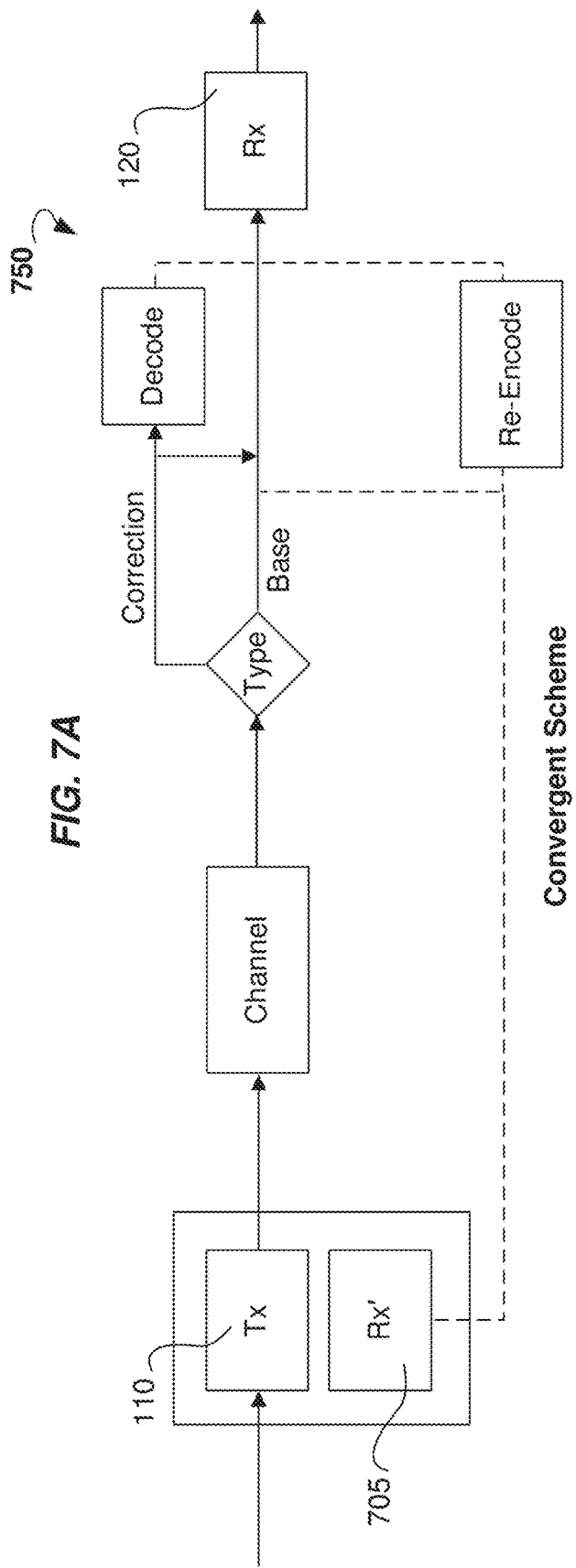
FIG. 7B illustrates a convergent feedback scheme, according to an example embodiment.

FIG. 7A illustrates a non-convergent feedback scheme 700. FIG. 7B illustrates a convergent feedback scheme 750. To implement the convergent feedback scheme 750, since the Tx side (transmitter 110) can receive indices from the Rx side (receiver 120), to utilize the indices, the Tx side requires a de-indexing procedure. The convergent multi-bit feedback system can use the same module as the Rx side to conduct de-indexing on the Tx side, as shown in FIG. 7B.

Specifically, sending back the indices to the transmitter means that the transmitter side not only needs to perform the indexing, which is converting the error vector to a network packet, but also needs to map the index to an original error vector. This means that the transmitter can have an indexing module Rx' 705 at the transmitter side to perform decoding.

Figure 8A:
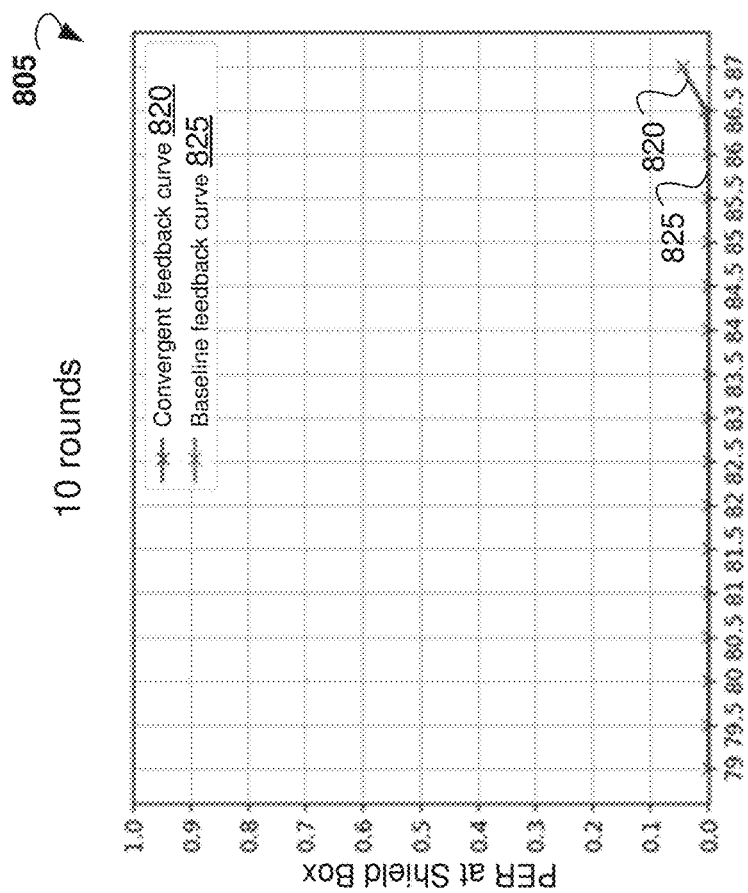
FIG. 8A shows performance of a system for convergent error vector indexing and retransmission in wireless data verifications of three rounds, according to one example embodiment.
Figure 8B:
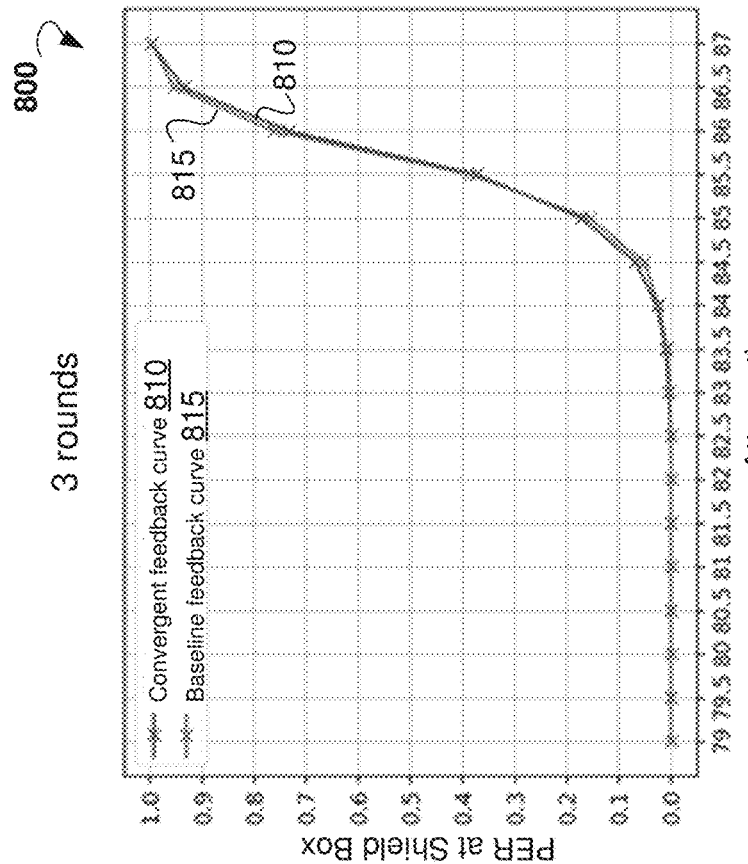
FIG. 8B shows performance of a system for convergent error vector indexing and retransmission in wireless data verifications of ten rounds, according to one example embodiment.

FIG. 8A shows the performance 800 of convergent feedback scheme for three rounds. FIG. 8B shows the performance 805 of a convergent feedback scheme for ten rounds. The reliability on Packet Error Rate (PER) simulation is the same, while the feedback bandwidth is significantly reduced, especially on high attenuation. FIG. 8A and FIG. 8B show feedback PER performance on three rounds (FIG. 8A) and ten rounds (FIG. 8B) without Acquisition Error Rate (AER). The reliabilities of both schemes are the same.

FIG. 8A and FIG. 8B show that for three rounds and ten rounds the performances are the same. Therefore, the performance of sending back the whole packet (see a baseline feedback curve 815 in FIG. 8A and a baseline feedback curve 825 in FIG. 8B) and the performance of sending back the immediate feedback (see a convergent feedback curve 810 in FIG. 8A and a convergent feedback curve 820 in FIG. 8B) are the same on PER sense. The PER metric may show (reveal) reliability of retransmission packets in three round and ten rounds of retransmission. Thus, FIG. 8A and FIG.

8B show that sending back small indices is equivalent in terms of performance to the sending back the whole network packet.

Figure 9B:
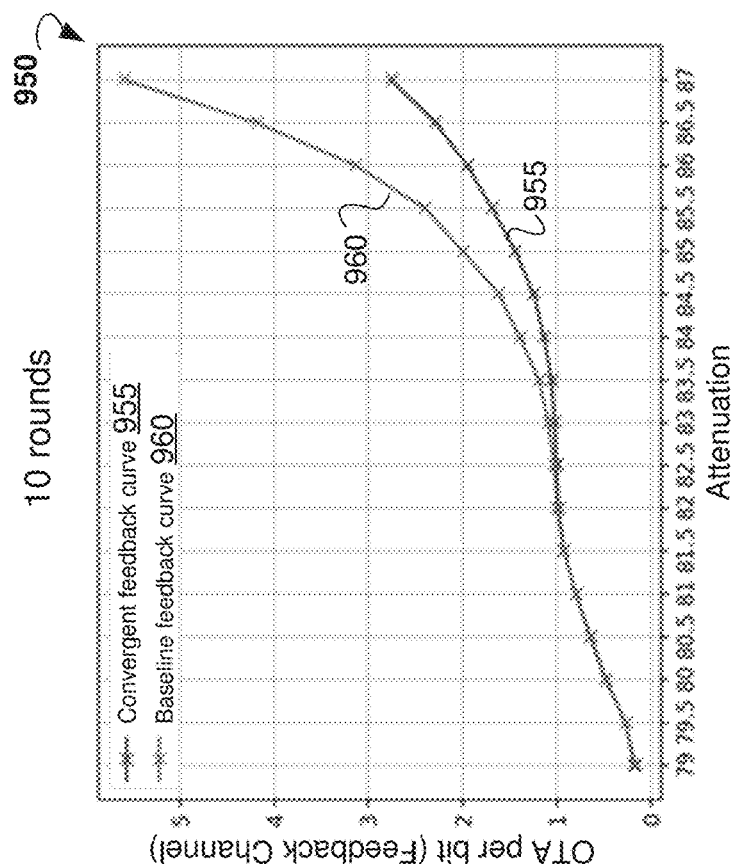
FIG. 9B show feedback bandwidth for ten rounds, according to an example embodiment.
Figure 9A:
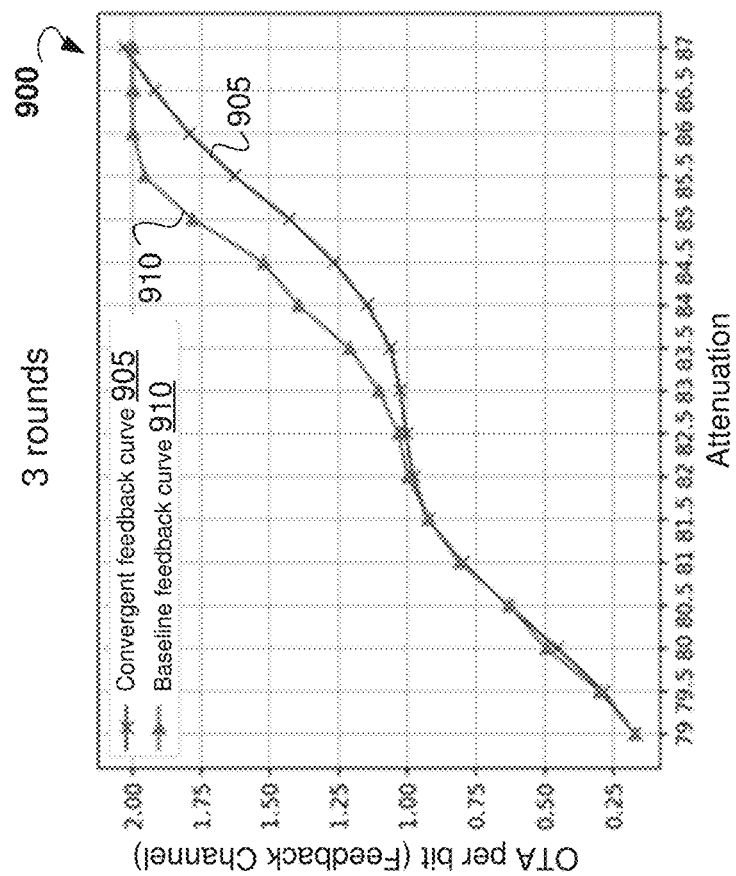
FIG. 9A shows feedback bandwidth for three rounds, according to an example embodiment.

FIG. 9A shows feedback bandwidth 900 for three rounds and FIG. 9Bs show feedback bandwidth 950 for ten rounds without AER. The feedback channel bandwidth is significantly improved, especially at higher attenuation levels.

The performances for feedback bandwidth of both the full feedback system and the convergent multi-bit feedback system are similar at low attenuations (see a convergent feedback curve 905 (the bandwidth used by the convergent multi-bit feedback system) and a baseline feedback curve 910 (the bandwidth used by the full feedback system) in FIG. 9A and see a convergent feedback curve 955 (the bandwidth used by the convergent multi-bit feedback system) and a baseline feedback curve 960 (the bandwidth used by the full feedback system) in FIG. 9B). The reason for this is that at low attenuation the forward channel is clean, thus two rounds are sufficient to transmit the message, while the convergent feedback scheme starts to improve after the second round. At high attenuations, the performance gain of the convergent feedback scheme is significant.

Figure 10:
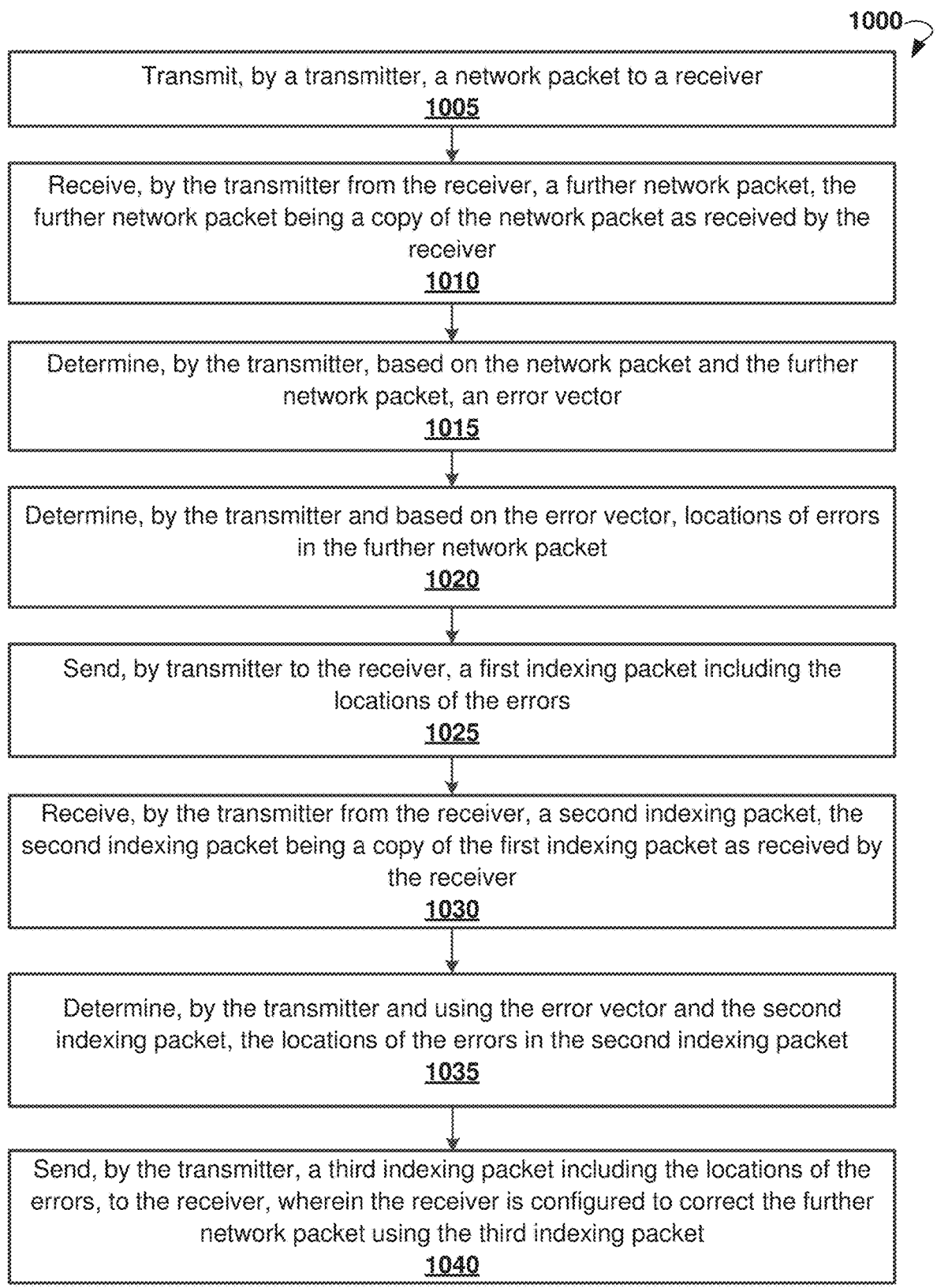
FIG. 10 is a flow chart of an example method for convergent error vector indexing and retransmission in wireless data verifications, according to some example embodiments.

FIG. 10 is a flow chart of an example method 1000 for convergent error vector indexing and retransmission in wireless data verifications. The method 1000 can be performed by the system for convergent error vector indexing and retransmission in wireless data verifications. Notably, the steps recited below may be implemented in order other than described and shown in the FIG. 10. Moreover, the method 1000 may have additional steps not shown herein, but which can be evident to those skilled in the art from the present disclosure.

The method may commence, in block 1005, with transmitting, by a transmitter, a network packet to a receiver. The receiver may be configured to decode the encoded first indexing packet to obtain the second indexing packet. The method may further include (A) receiving, in block 1010, by the transmitter from the receiver, a further network packet. The further network packet may be a copy of the network packet as received by the receiver.

The method then continues with (B) determining, in block 1015, by the transmitter, an error vector. The error vector may be determined based on the network packet and the further network packet. The error vector may be a difference between a payload of the network packet and a further payload of the further network packet. The method may include (C) determining, in block 1020, by the transmitter and based on the error vector, locations of errors in the further network packet.

The method may further continue with (D) sending, in block 1025, by the transmitter to the receiver, a first indexing packet including the locations of the errors. The method 1000 may, optionally, include, prior to the sending the first indexing packet, encoding the first indexing packet using an error-correction code. The transmitter and the receiver can be communicatively coupled via a wireless communication channel. The wireless communication channel can be an asymmetrical communication channel including a first channel and a second channel. The second channel may have a stronger signal. The transmitter may be configured to send first messages to the receiver via the first channel. The receiver may be configured to send second messages to the transmitter via the second channel. The wireless communication channel may include a mobile phone cellular network channel.

The method may include (E) receiving, in block 1030, by the transmitter from the receiver, a second indexing packet. The second indexing packet may be a copy of the first indexing packet as received by the receiver. The method may continue with (F) determining, in block 1035, by the transmitter and using the error vector and the second indexing packet, the locations of the errors in the second indexing packet.

The method may then proceed with (G) sending, in block 1040, by the transmitter, a third indexing packet including the locations of the errors to the receiver. The method 1000 may further include, prior to the sending the third indexing packet, encoding the third indexing packet using the error-correction code. The receiver may be configured to correct the further network packet using the third indexing packet. The receiver may be further configured to decode, prior to correcting the further network packet, the encoded third indexing packet to obtain the third indexing packet. The receiver may be configured to generate, based on the third indexing packet, a further error vector. The receiver may be further configured to perform bitwise summation of the further error vector and a further payload of the further network packet to correct the further network packet. The receiver may be further configured to determine that the further network packet has been corrupted by testing a check sum of a further payload of the further network packet.

The method 1000 may then receive, by the transmitter from the receiver, an indication that the further network packet has been corrupted. The method 1000 may c repeating, by the transmitter, operations (A), (B), (C), (D), (E), (F), and (G).

Figure 11:
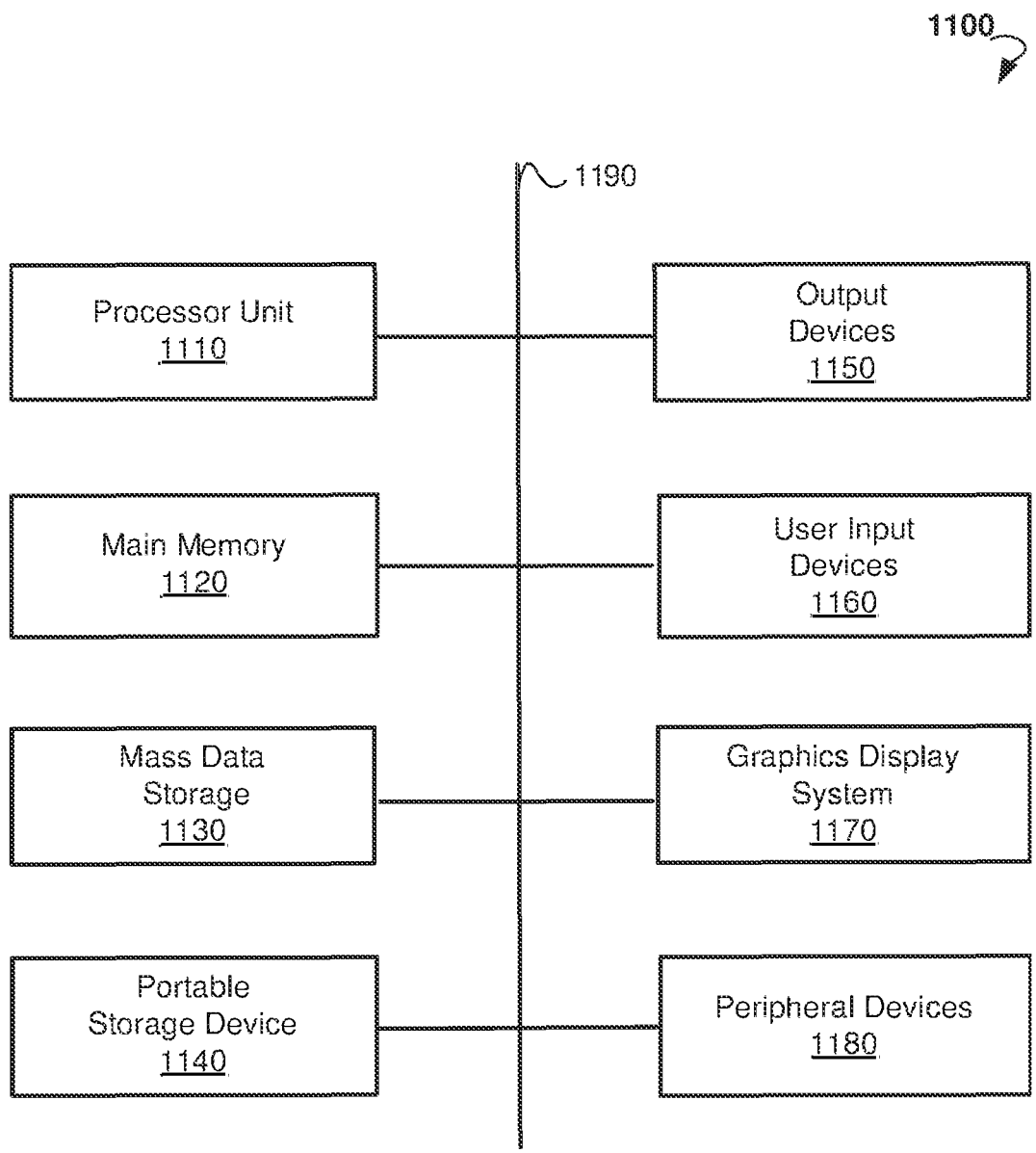
FIG. 11 illustrates an exemplary computer system that may be used to implement some embodiments of the present disclosure.

FIG. 11 illustrates an exemplary computer system 1100 that may be used to implement some embodiments of the present disclosure. The computer system 1100 of FIG. 11 includes one or more processor units 1110 and a main memory 1120. The main memory 1120 stores, in part, instructions and data for execution by the processor units 1110. The main memory 1120 stores the executable code when in operation, in this example. The computer system 1100 of FIG. 11 further includes a mass data storage 1130, a portable storage device 1140, output devices 1150, user input devices 1160, a graphics display system 1170, and peripheral devices 1180.

The components shown in FIG. 11 are depicted as being connected via a single bus 1190. The components may be connected through one or more data transport means. The processor unit 1110 and the main memory 1120 are connected via a local microprocessor bus, and the mass data storage 1130, the peripheral device(s) 1180, the portable storage device 1140, and the graphics display system 1170 are connected via one or more I/O buses.

The mass data storage 1130, which can be implemented with a magnetic disk drive, solid state drive, or an optical disk drive, is a non-volatile storage device for storing data and instructions for use by the processor unit 1110. The mass data storage 1130 stores the system software for implementing embodiments of the present disclosure for purposes of loading that software into the main memory 1120.

The portable storage device 1140 operates in conjunction with a portable non-volatile storage medium, such as a flash drive, floppy disk, compact disk, digital video disc, or Universal Serial Bus storage device, to input and output data and code to and from the computer system 1100 of FIG. 11. The system software for implementing embodiments of the present disclosure is stored on such a portable medium and input to the computer system 1100 via the portable storage device 1140.

The user input devices 1160 can provide a portion of a user interface. The user input devices 1160 may include one or more microphones; an alphanumeric keypad, such as a keyboard, for inputting alphanumeric and other information; or a pointing device, such as a mouse, a trackball, stylus, or cursor direction keys. The user input devices 1160 can also include a touchscreen. Additionally, the computer system 1100 as shown in FIG. 11 includes the output devices 1150. Suitable output devices 1150 include speakers, printers, network interfaces, and monitors.

The graphics display system 1170 can include a liquid crystal display or other suitable display device. The graphics display system 1170 is configurable to receive textual and graphical information and process the information for output to the display device.

The peripheral devices 1180 may include any type of computer support device to add additional functionality to the computer system.

The components provided in the computer system 1100 of FIG. 11 are those typically found in computer systems that may be suitable for use with embodiments of the present disclosure and are intended to represent a broad category of such computer components that are well known in the art. Thus, the computer system 1100 of FIG. 11 can be a personal computer, a handheld computer system, a telephone, a mobile phone, a smartphone, a laptop computer, a mobile computer system, a workstation, a tablet, a phablet, a server, a minicomputer, a mainframe computer, a wearable device, or any other computer system. The computer system 1100 may also include different bus configurations, networked platforms, multi-processor platforms, and the like. Various operating systems may be used including UNIX®, LINUX®, WINDOWS®, MAC OS®, PALM OS®, QNX®, ANDROID®, IOS®, CHROME®, TIZEN®, and other suitable operating systems.

The processing for various embodiments may be implemented in software that is cloud-based. In some embodiments, the computer system 1100 is implemented as a cloud-based computing environment, such as a virtual machine operating within a computing cloud. In other embodiments, the computer system 1100 may itself include a cloud-based computing environment, where the functionalities of the computer system 1100 are executed in a distributed fashion. Thus, the computer system 1100, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1100, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, systems and methods for convergent error vector indexing and retransmission in wireless data verifications are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A method comprising:
transmitting, by a transmitter, a network packet to a receiver;
(A) receiving, by the transmitter from the receiver, a further network packet, the further network packet being a copy of the network packet as received by the receiver;
(B) determining, by the transmitter, based on the network packet and the further network packet, an error vector;
(C) determining, by the transmitter and based on the error vector, locations of errors in the further network packet;
(D) sending, by the transmitter to the receiver, a first indexing packet including the locations of the errors;
(E) receiving, by the transmitter from the receiver, a second indexing packet, the second indexing packet being a copy of the first indexing packet as received by the receiver;
(F) determining, by the transmitter and using the error vector and the second indexing packet, the locations of the errors in the second indexing packet; and
(G) sending, by the transmitter, a third indexing packet including the locations of the errors to the receiver, wherein the receiver is configured to correct the further network packet using the third indexing packet.

2. The method of claim 1, further comprising:
prior to the sending the first indexing packet, encoding the first indexing packet using an error-correction code; and
prior to the sending the third indexing packet, encoding the third indexing packet using the error-correction code.

3. The method of claim 2, wherein the receiver is configured to:
decode the encoded first indexing packet to obtain the second indexing packet; and
prior to correcting the further network packet, decode the encoded third indexing packet to obtain the third indexing packet.

4. The method of claim 1, wherein the error vector is a difference between a payload of the network packet and a further payload of the further network packet.

5. The method of claim 1, wherein the receiver is configured to:
generate, based on the third indexing packet, a further error vector; and
perform bitwise summation of the further error vector and a further payload of the further network packet to correct the further network packet.

6. The method of claim 1, further comprising:
receiving, by the transmitter from the receiver, an indication that the further network packet has been corrupted; and
repeating, by the transmitter, operations (A), (B), (C), (D), (E), (F), and (G).

7. The method of claim 1, wherein the receiver is configured to determine that the further network packet has been corrupted by testing a check sum of a further payload of the further network packet.

8. The method of claim 1, wherein the transmitter and the receiver are communicatively connected via a wireless communication channel.

9. The method of claim 8, wherein:
the wireless communication channel is an asymmetrical communication channel including a first channel and a second channel, the second channel having a stronger signal;
the transmitter is configured to send first messages to the receiver via the first channel; and
the receiver is configured to send second messages to the transmitter via the second channel.

10. The method of claim 8, wherein the wireless communication channel includes a mobile phone cellular network channel.

11. A system comprising:
at least one processor; and
a memory communicatively coupled to the processor, the memory storing instructions executable by the at least one processor to perform a method comprising:
transmitting, by a transmitter, a network packet to a receiver;
(A) receiving, by the transmitter from the receiver, a further network packet, the further network packet being a copy of the network packet as received by the receiver;
(B) determining, by the transmitter, based on the network packet and the further network packet, an error vector;
(C) determining, by the transmitter and based on the error vector, locations of errors in the further network packet;
(D) sending, by the transmitter to the receiver, a first indexing packet including the locations of the errors;
(E) receiving, by the transmitter from the receiver, a second indexing packet, the second indexing packet being a copy of the first indexing packet as received by the receiver;
(F) determining, by the transmitter and using the error vector and the second indexing packet, the locations of the errors in the second indexing packet; and
(G) sending, by the transmitter, a third indexing packet including the locations of the errors to the receiver, wherein the receiver is configured to correct the further network packet using the third indexing packet.

12. The system of claim 11, wherein the processor is further configured to:
prior to the sending the first indexing packet, encode the first indexing packet using an error-correction code; and
prior to the sending the third indexing packet, encode the third indexing packet using the error-correction code.

13. The system of claim 12, wherein the receiver is configured to:
decode the encoded first indexing packet to obtain the second indexing packet; and
prior to correcting the further network packet, decode the encoded third indexing packet to obtain the third indexing packet.

14. The system of claim 11, wherein the error vector is a difference between a payload of the network packet and a further payload of the further network packet.

15. The system of claim 11, wherein the receiver is configured to:
generate, based on the third indexing packet, a further error vector; and
perform bitwise summation of the further error vector and a further payload of the further network packet to correct the further network packet.

16. The system of claim 11, wherein the processor is further configured to:
receive, using the transmitter, from the receiver, an indication that the further network packet has been corrupted; and
repeat, using the transmitter, operations (A), (B), (C), (D), (E), (F), and (G).

17. The system of claim 11, wherein the receiver is configured to determine that the further network packet has been corrupted by testing a check sum of a further payload of the further network packet.

18. The system of claim 11, wherein the transmitter and the receiver are communicatively connected via a wireless communication channel.

19. The system of claim 18, wherein:
the wireless communication channel is an asymmetrical communication channel including a first channel and a second channel, the second channel having a stronger signal;
the transmitter is configured to send first messages to the receiver via the first channel; and
the receiver is configured to send second messages to the transmitter via the second channel.

20. A non-transitory processor-readable medium having embodied thereon a program being executable by at least one processor to perform a method comprising:
transmitting, by a transmitter, a network packet to a receiver;
receiving, by the transmitter from the receiver, a further network packet, the further network packet being a copy of the network packet as received by the receiver;
determining, by the transmitter, based on the network packet and the further network packet, an error vector;
determining, by the transmitter and based on the error vector, locations of errors in the further network packet;
sending, by the transmitter to the receiver, a first indexing packet including the locations of the errors;
receiving, by the transmitter from the receiver, a second indexing packet, the second indexing packet being a copy of the first indexing packet as received by the receiver;
determining, by the transmitter and using the error vector and the second indexing packet, the locations of the errors in the second indexing packet; and
sending, by the transmitter, a third indexing packet including the locations of the errors to the receiver, wherein the receiver is configured to correct the further network packet using the third indexing packet.

* * * * *